Patented Apr. 17, 1934

1,955,547

UNITED STATES PATENT OFFICE 1,955,547

METHOD OF MAKING COMPOSITE METAL ARTICLES

Stephen L. Ingersoll, Chicago, Ill., assignor to Ingersoll Steel and Disc Co., Chicago, Ill., a corporation of Illinois No Drawing. Application August 8, 1932, Serial No. 627,989

9 Claims. (Cl. 29—189)

This invention relates to a method of making metallic articles and more particularly to a method of making metallic articles having extensive surfaces of a stable surface alloy, such as stainless steel or other ferrous alloy containing chromium of the corrosion and heat resistant type.

In Patent No. 1,868,749, issued to me on July 26, 1932, I have described a method of making laminated metallic articles, of which the present invention constitutes a modification and, for some purposes, an improvement. According to the patented process, two metals, slabs or the like, having polished, smooth, clean, or otherwise suitably prepared surfaces are placed together with such prepared surfaces in juxtaposed relation but separated by a medium that prevents permanent or substantial welding of said surfaces in the subsequent operations. Preferably, the adjacent edges surrounding the common prepared surfaces of the composite slabs are sealed, as by welding, and the composite slabs placed into a mold, into which a metal of dissimilar character is then poured to surround the composite slabs. After the removal from the mold, according to my patented process, the ingot is subjected to a hot rolling operation which completely welds the cast metal to the metal slabs but does not weld, to any substantial degree, the prepared surfaces, due to the presence of the separating medium. The rolled form is thereupon separated along the prepared surfaces to form two composite sheets, each of which presents a greatly extended surface of the desired character.

I have now found that a process such as described in my previously issued patent may be suitably carried out using a strong oxidizing agent as the separating medium for preventing the substantial welding together of the prepared surfaces, such as a chromium-oxygen compound, e. g. chromium trioxide ($CrO_3$), chromic oxide ($Cr_2O_3$) and the like. One of the advantages of using a chromium compound of this type is that such compound does not deleteriously affect the properties of the stainless steel or other corrosion and heat resistant alloy. Another advantage is that the coated surfaces after the rolling operation and after separation can be easily cleaned by subjecting them to the usual pickling processes.

It is therefore an object of this invention to provide an improved type of separating medium for use in preventing the prepared surfaces of a corrosion and heat resistant alloy from becoming substantially welded together during an extension of such prepared surfaces at forging temperatures.

It is a further important object of this invention to provide a method of making composite metallic articles having extensive surfaces of a stable surface alloy wherein a separating medium of the chromium trioxide type is used to prevent substantial bonding of said surfaces during a hot rolling operation for extending the surface areas.

Other and further important objects of this invention will become apparent from the following description and appended claims.

In its preferred form, my present invention contemplates the use of a separating medium of the chromium trioxide type in a method such as broadly described and claimed in my previously issued Patent No. 1,868,749. The separating medium of my present invention, however, can be used in any method wherein it is desired to secure an extensive surface area of a corrosion and heat resistant alloy by subjecting a plate, slab, or a multiple number of plates, slabs or the like, of relatively small surface area to a rolling operation at forging temperatures. The use of the separating medium of my present invention serves to protect a prepared surface of a stable surface alloy, or the like, during an extension of such surface, as by a hot rolling process, and thus to permit the obtaining directly of an extended surface having satisfactory qualities for general purposes without the necessity of the extensive polishing, grinding, or like finishing steps.

According to the preferred method of my invention, the general steps employed include first pickling, polishing, cold-rolling, or otherwise cleaning and preparing a surface of two or more metal slabs of the desired combination or analysis. The slabs are preferably of a corrosion and heat resistant type of alloy, of which the so-called stainless steels are typical. In general, this type of alloy contains varying quantities of chromium with or without nickel, the balance being principally ferrous metal. A typical, so-called stainless steel contains 18% chromium and 8% nickel, but ferrous metals containing 12, 14, 16 and 18% chromium, with no nickel, are also included within the class of corrosion resistant alloys or the stainless steel and rustless iron type.

The prepared surfaces of the slabs of stable surface alloy are next provided with a coating composition of my present invention. I have found that an oxygen containing compound of chromium, such as chromic acids, chromium trioxide ($CrO_3$), and other oxides of chromium are best suited for use as a separating medium. Other compounds of chromium containing oxygen, such as the alkali metal chromate and bichromate can be used, but not so satisfactorily.

My preferred method of coating the prepared surfaces with a separating medium is to apply a coating, as by brushing or spraying, of an aqueous solution of chromium trioxide ($CrO_3$). The coating solution may be made up in any suitable concentration that can be readily sprayed or brushed onto the surface of the slab. For instance, I find that a suitable solution can be prepared by dissolving 100 parts by volume of chromium trioxide crystals in 125 parts by volume of water. Preferably, the slabs or plates to which the coating solution is to be applied, are first warmed somewhat so as to dry the coating as rapidly as it is applied. If this is not done, the solution does not spread uniformly and draws away from certain parts, exposing the metal. Preferably, a number of coatings are applied to the prepared surfaces, allowing each coating to dry substantially before the next coating is applied. In general, four coatings are sufficient, but more can be used where necessary to allow for greater extension of the surfaces in the subsequent rolling operations.

After the prepared surfaces have been properly coated, the slabs are placed in juxtaposed relation with the coated, prepared surfaces together, and the adjacent edges of the metal slabs are preferably sealed, as by welding, around the common surface area, so as to prevent damage to the inner or enclosed surfaces during the subsequent operations.

The multi-ply, or composite slab thus formed is placed in a mold and a metal, usually of a different character or analysis, is poured around the slab and allowed to cool. The composition or analysis of the metal that is poured around the composite slab will depend largely upon the use to which the ultimate product is to be put and may be any ferrous metal or alloy capable of becoming bonded with or welded to the particular alloy of whom the composite slab is composed. For instance, the pouring metal may be a mild steel where drawing and ductile qualities are desired.

A specific example is 10-point carbon steel.

After the contents of the mold have cooled, the composite ingot is removed from the mold and again heated to a welding or forging temperature. The composite ingot is then hot passed one or more times through rolls to spread it out into a composite or laminated sheet. The rolling operation is preferably continued until the composite or laminated sheet is a multiple number of times the desired thickness of the ultimate sheet. For instance, if two slabs of the stable surface alloy are initially used in forming the composite slab around which the dissimilar metal is poured, then the thickness to which the composite sheet is rolled will be twice that of the desired thickness of the ultimate sheet.

After the composite sheet has been rolled down to the desired thickness, the marginal edges are clipped off back to the edges of the common surfaces to permit separation along such surfaces. As previously stated, the separating medium prevents substantial bonding of the juxtaposed surfaces that have been coated with the separating medium, so that as soon as the marginal edges have been clipped, separation is readily effected. Where an oxide of chromium, such as chromium trioxide ($CrO_3$), is used as the separating medium, the oxide itself, or its decomposition products, prevents the welding together of the prepared surfaces. This is in accordance with the well known fact that oxidized surfaces or surfaces coated with oxide cannot be satisfactorily welded. In some instances, also, some oxygen may be evolved by decomposition of the oxide of chromium employed and this may also serve to separate the prepared surfaces and prevent them from becoming welded together. Thus, there may be actual oxidation of the chromium content of the stable surface alloy used in preparing the original slab, and this oxidation of the surface, together with the coating of chromium oxide, effectively prevents the welding together of the prepared surfaces.

One of the important features of the use of an oxide of chromium is that the chromium content of the oxide will not deleteriously affect the prepared surfaces. If other metals were used that were capable of alloying with or changing the analysis of the stable surface alloy, it might be expected that the properties of the stable surface alloy would be changed, at least at or near the surfaces. Where chromium is used as the sole metallic constituent of the separating medium, it is immaterial whether the chromium of the separating compound unites with the stable surface alloy or not. Where other compounds are used for coating the prepared surfaces, such as sodium silicate, sodium carbonate or the like, these compounds together with oxides tend to collect in small lumps on the prepared surfaces and frequently result in a pitting of the surfaces. This is not the case where a chromium oxide is used, since the chromium oxide remains in an extremely finely divided condition on the prepared surfaces, without pitting the surfaces, and may be easily removed from the final sheet by an ordinary pickling operation.

As a result of the use of the separating medium of my present invention, the ultimate composite sheets are provided with surfaces of the corrosion and heat resistant alloy, that are sufficiently smooth for many purposes without subsequent polishing or other finishing steps. It is thus possible to produce very large, smooth, satisfactory surfaces of a corrosion and heat resistant alloy from relatively small, smooth and prepared surfaces by the method herein described. In general, the ultimate sheet can be made of relatively large area and relatively thin, with an extremely thin surface coating of desired stable surface alloy, such as stainless or any other corrosion and heat resistant alloy.

It will be understood that in addition to the specific advantages herein pointed out, there are also obtained the general advantages that accrue from the general method described and claimed in my prior issued Patent No. 1,868,749, to which reference may be had for the general features of my method.

I am aware that many details of the invention may be varied through a wide range without departing from the spirit of this invention, and I do not desire limiting the patent granted other than necessitated by the prior art.

I claim as my invention:

1. In the method of preparing a composite metallic article, the step of coating surfaces of a chromium containing stable surface alloy that are to be placed together, with a compound consisting of chromium and oxygen to prevent said surfaces from becoming substantially welded together in subsequent operations involving forging temperatures.

2. In the method of preparing a composite metallic article, the step of coating surfaces of a chromium-ferrous alloy that are to be placed together, with chromium trioxide ($CrO_3$) to prevent said surfaces from becoming substantially welded together in subsequent operations involving forging temperatures.

3. In the method of preparing a composite metallic article having a ply of a chromium containing stable surface alloy and a ply of a ferrous metal united thereto, the steps of coating surfaces of slabs of the stable surface alloy with a chromium-oxygen compound, placing said coated surfaces in juxtaposed relation, sealing the resulting common coated surface area and casting a ferrous metal about the stable surface alloy slabs.

4. In the method of preparing a composite metallic article having a ply of a chromium containing stable surface alloy and a ply of a ferrous metal united thereto, the steps of coating surfaces of slabs of the stable surface alloy with a compound consisting of chromium and oxygen, placing said coated surfaces in juxtaposed relation, sealing the resulting common coated surface area and casting a ferrous metal about the stable surface alloy slabs.

5. In the method of preparing a composite metallic article having a ply of a chromium containing stable surface alloy and a ply of a ferrous metal united thereto, the steps of coating surfaces of slabs of the stable surface alloy with chromium trioxide ($CrO_3$), placing said coated surfaces in juxtaposed relation, sealing the resulting common coated surface area and casting a ferrous metal about the stable surface alloy slabs.

6. In the method of preparing laminated metal having a surface of a corrosion resistant alloy containing chromium, the step of providing surfaces of said alloy that are to be temporarily sealed in juxtaposed relation and subsequently subjected to forging temperatures, with a coating of finely divided, uniformly distributed chromium trioxide ($CrO_3$).

7. In a process such as herein described, the steps of coating heated surfaces of a corrosion resistant alloy containing chromium with an aqueous solution of chromium trioxide, allowing said surfaces to dry, sealing juxtaposed coated surfaces, casting a metal around the alloy, extending the resulting pack at forging temperatures, subsequently separating said surfaces and pickling said surfaces.

8. In a process of preparing metallic articles having extensive chromium containing corrosion resistant surfaces from slabs or the like of smaller surface area, the steps of providing prepared slab surfaces with a coating of chromium trioxide, placing said coated slab surfaces together, extending said coated surface areas at forging temperatures, and separating and pickling said prepared surfaces.

9. In a process of preparing metallic articles having extensive chromium containing corrosion resistant surfaces from slabs or the like of smaller surface area, the steps of providing prepared slab surfaces with a coating of an oxide of chromium, placing said coated slab surfaces together, extending said coated surface areas at forging temperatures, and separating and pickling said prepared surfaces.

STEPHEN L. INGERSOLL.